(12) United States Patent
Torre

(10) Patent No.: US 7,124,555 B2
(45) Date of Patent: Oct. 24, 2006

(54) DEVICE AND PROCESS FOR PACKAGING PRODUCTS IN A STRETCHABLE PLASTIC FILM

(75) Inventor: Francesco Torre, Dalmine (IT)

(73) Assignee: Minipack-Torre S.p.A., Dalmine (IT)

( * ) Notice: Subject to any disclaimer, the term of this patent is extended or adjusted under 35 U.S.C. 154(b) by 55 days.

(21) Appl. No.: 10/534,897

(22) PCT Filed: Apr. 17, 2003

(86) PCT No.: PCT/IT03/00256

§ 371 (c)(1),
(2), (4) Date: May 13, 2005

(87) PCT Pub. No.: WO2004/048201

PCT Pub. Date: Jun. 10, 2004

(65) Prior Publication Data
US 2005/0279055 A1   Dec. 22, 2005

(30) Foreign Application Priority Data
Nov. 22, 2002  (IT)  .......................... TO2002A1017

(51) Int. Cl.
   B65B 53/00   (2006.01)
   B65B 51/10   (2006.01)
(52) U.S. Cl. ............................. 53/441; 53/463; 53/218; 53/226
(58) Field of Classification Search .................. 53/441, 53/442, 461, 463, 141, 557, 218, 226, 219, 53/390
See application file for complete search history.

(56) References Cited

U.S. PATENT DOCUMENTS

| 3,354,605 | A | * | 11/1967 | Amberg et al. ................ 53/412 |
| 3,479,789 | A | * | 11/1969 | Harrison ....................... 53/463 |
| 3,693,318 | A | * | 9/1972 | Balzer et al. ............... 53/329.3 |
| 3,967,433 | A | * | 7/1976 | Bonfiglioli .................... 53/441 |
| 4,257,212 | A | * | 3/1981 | Havens ......................... 53/463 |
| 4,279,113 | A | * | 7/1981 | Halm ........................... 53/219 |
| 4,650,535 | A |   | 3/1987 | Bennett et al. ............. 156/352 |
| 4,796,405 | A | * | 1/1989 | Owen et al. .................. 53/222 |
| 5,408,800 | A | * | 4/1995 | Hsu ............................. 53/221 |
| 6,185,913 | B1 |  | 2/2001 | Cappi et al. .................. 53/511 |

FOREIGN PATENT DOCUMENTS

EP   0 890 508 A1   1/1999
FR   2 772 345 A    6/1999

* cited by examiner

Primary Examiner—Stephen F. Gerrity
Assistant Examiner—Paul Durand
(74) Attorney, Agent, or Firm—David A. Farah; Sheldon & Mak PC

(57) ABSTRACT

A process and a device are disclosed for packaging products in a stretchable plastic film; the device comprises: means for supporting and heating a product; means for supplying and clamping the film in a position overlaying the product; means for contacting and adhering the film, when stretched, to the product; means for cutting the film along its still not-free side; means for locking and releasing the cut film in stretched contact with the product; means for bending and adhering the film to the product through a bending action on the whole product perimeter; means for removing the packaged product; and control means for the device.

46 Claims, 7 Drawing Sheets

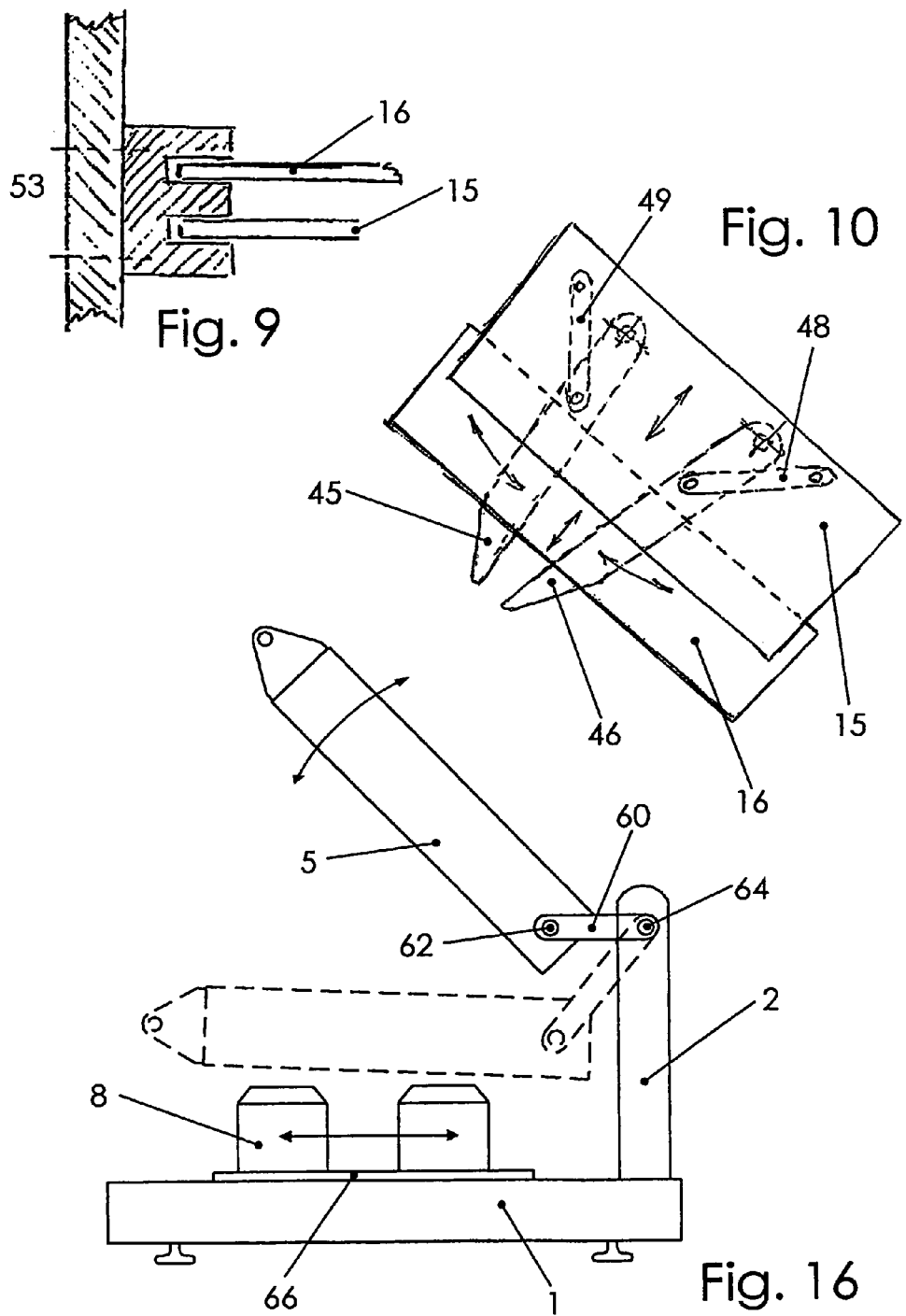

DEVICE AND PROCESS FOR PACKAGING PRODUCTS IN A STRETCHABLE PLASTIC FILM

CROSS-REFERENCE TO RELATED APPLICATION

This application is a national phase filing of International Patent Application No. PCT/IT2003/000256 entitled "Device For Packaging Products In A Stretchable Plastic Film," filed Apr. 17, 2003, which claims priority from Italian Patent Application No. TO2002A001017 filed Nov. 22, 2002; the contents of which are incorporated by reference herein in their entirety.

BACKGROUND

The present invention refers to a device for packaging products in a stretchable plastic film, and to a process that uses such device. The below-described device is in practice an electromechanical arrangement that performs the winding of a product to be packaged into a plastic film, in a surrounding and stretched way, completely closing the product to be packaged.

Various systems are known in the art and operate, through different modes, to perform the winding of a plastic film around a product. These systems, that are generally automated, operate by pushing the product to be packaged either inside a sleeve formed by the plastic film that is afterwards cut and bent on the two sides under the product, or by pushing the product to be packaged upwards from below on a sheet of plastic film, stretched through suitable mechanical means and clamping jaws, and afterwards bent under the product itself through a jaw mechanism with automatic movement and with a possible product translation.

These systems require machines with highly complex and costly mechanical devices with many motored and specifically programmed parts. In such case it is difficult to constantly operate such machines that require, in addition to specific plastic films with high quality, high maintenance costs, given the complex contents of the various mechanisms composing them. They further require a high degree of preventive maintenance from the operator, since residuals of the various products to be packaged can obstruct the movements of the mechanical machine parts, especially the means for clamping and stretching the plastic film.

SUMMARY

The object of the present invention is solving the above prior-art problems, by providing a device and its related process, that are easily manufactured, installed and operated, and allow performing all packaging operations manually, but also automatically, in a simple and straightforward way by the end user.

A further object of the present invention is providing a device and a process as mentioned above, in which the device is equipped with a reduced number of component parts, and anyway allows realizing a great number of packaging operations (also of a variable format) in a controlled and efficient way, without damages for the operators.

The above and other objects and advantages of the invention, as will appear from the following description, are obtained by a device and a process as claimed. Preferred embodiments and non-trivial variations of the present invention are claimed in the dependent claims.

FIGURES

These and other features, aspects and advantages of the present invention will become better understood with regard to the following description, appended claims, and accompanying figures where:

FIG. 9 is a part of the bending blades of the device in FIG. 1;

FIG. 10 is another part of the bending blades in their mutual position and handling;

FIG. 16 is a schematic side view of a variation of the device of the invention.

DESCRIPTION

With reference to the Figures, a preferred embodiment of the device and process of the present invention is shown and described. It will be immediately obvious to the skilled people in the art that numerous variations and modifications (for example, related to shape, sizes, various colours and parts with equivalent functionalities) could be made to the described device and process without departing from the scope of the invention as claimed in the enclosed claims.

The term "product" herein below means both a single object or element to be packaged (for example in the foodstuff field), and the same object or element placed in a container, housing, tray or the like, for packaging the whole assembly.

The device described herein below corresponds to a semi-automatic system in which the functions of supplying the plastic film 14 for packaging the products are performed manually, as well as the descent of the packaging head 5 (see FIG. 1-2).

Figure 1:
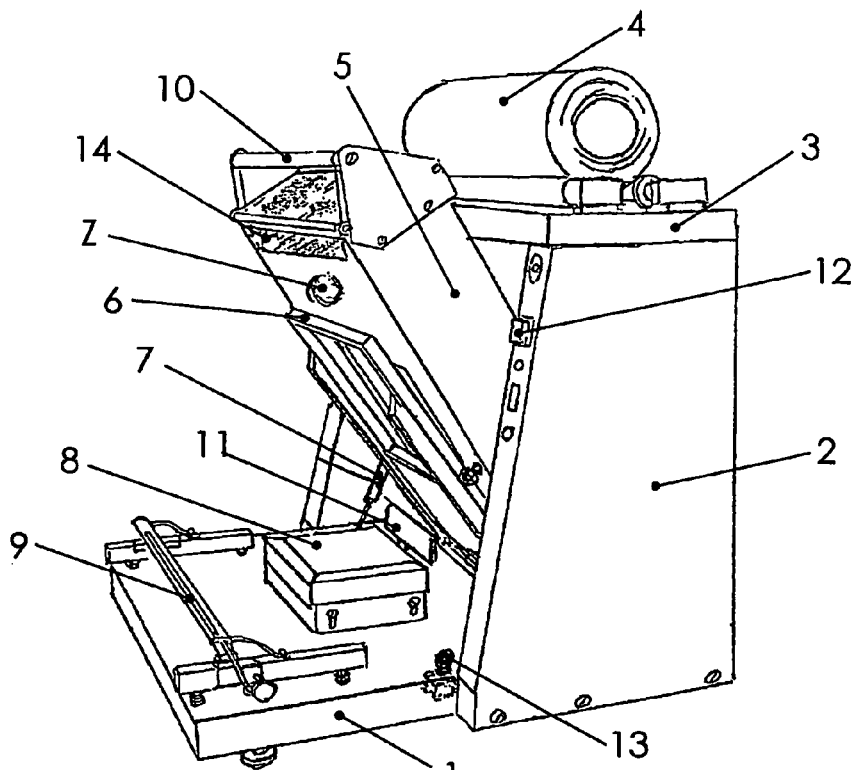
FIG. 1 is a perspective view of an embodiment of the packaging device according to the present invention in its opening phase.
Figure 2:
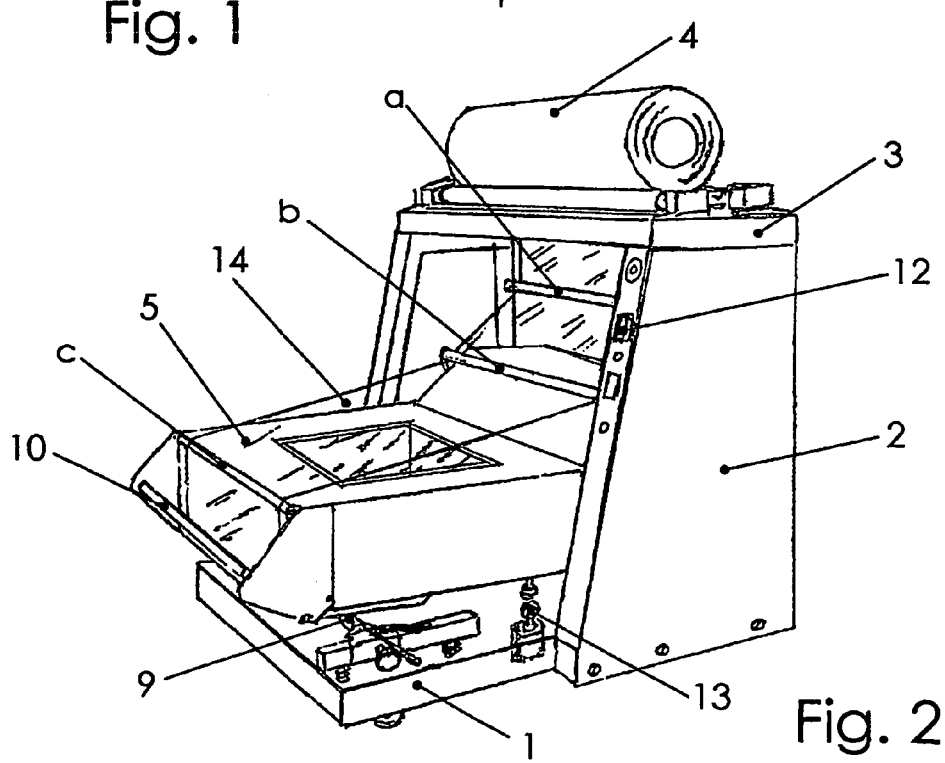
FIG. 2 is a perspective view of the device of FIG. 1 in a closure phase.
Figure 3:
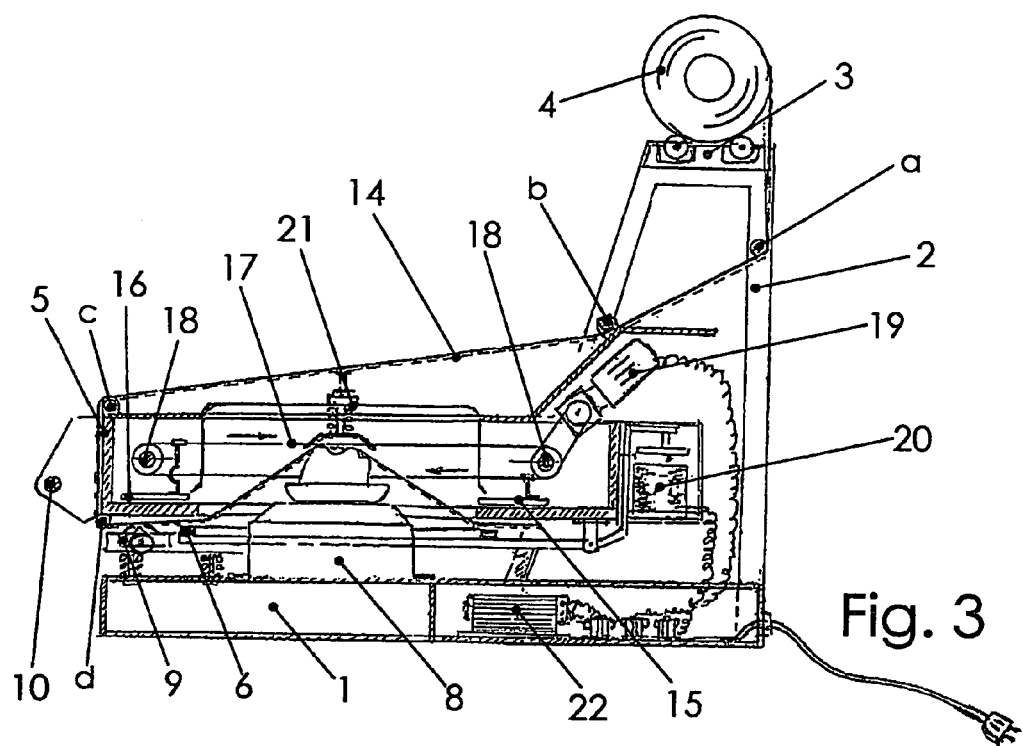
FIG. 3 is a side sectional view of the device in FIG. 2.

First of all, with reference to FIG. 1, the device consists of a basement 1, where two shoulders 2 are fixed that carry the head with rollers 3 that support the coil 4 of the stretchable plastic film 14. In the shoulders 2, the visual devices 12 of the electric control panel (for example displays of the number of packaged pieces, switches, etc.) can be inserted.

The basement 1 is composed of a structure that is sturdy enough to support all efforts acting on pins and connections of the related gas springs 7 that balance the head 5, in order to secure the side shoulders 2. Moreover, the heated plane 8 and the rotating and restraining supports (not shown) of the basculating head 5 are fastened on the basement 1. Moreover, the suitable limit sensors (not shown) for operating the machine, in addition to all those components related to the electric panel (not shown), are fastened and contained in the basement 1.

In order to work with the above-mentioned device, the coil 4 of the stretchable plastic film 14 is placed on the roller head 3 of the machine. The film 14 is unwound through the containment rollers a, b, c, d of the basculating packaging head 5. Manually, or automatically, the film 14 must be interposed for its meaningful length, suitable for packaging, between the basculating head plane Z and the film-locking frame 6.

In order to best use the film 14 that winds the product to be packaged in its correct length, a hot-wire cutter 9 for the film 14 is adjusted and is placed on the basement 1 by horizontally translating it and making it operate when the head 5 is lowered.

After that, the product (or tray containing the product) is placed on the hot plane 8 by positioning it in its correct position, using the stop abutment 11. At that time, by lowering the packaging head 5 through the handle 10 down to the lower stop of the head 5 itself, the limit sensor 13 is actuated in the same position and it starts the suitable mechanisms placed inside the head 5, that are adapted to wind the film 14 onto the product (or tray containing the product) along all its sides in a stretched way.

After having ended the automatic packaging cycle, the packaging head 5 is kept in its upper stop position (see FIG. 1), and the packaged product arranged on the hot abutment plane 8 can be manually taken by the operator. It is obviously possible to provide for variations that allow automating such operation, for example as bands (not shown) adapted to be handled when the device head 5 is in its upper stop position to take the packaged product and lay a new product to be packaged on the abutment plane 8.

The abutment plane 8 is heated in order to obtain a closed and stable package, since the heat emanated therefrom heats the four edges of the film 14 overlapped by the machine and inserted under the product by the machine itself, thereby attaching the film 14 edges to the product.

Herein below, the parts and the mechanical and electromechanical arrangements that realize the functionalities of the present invention will be described and shown.

Figure 4:
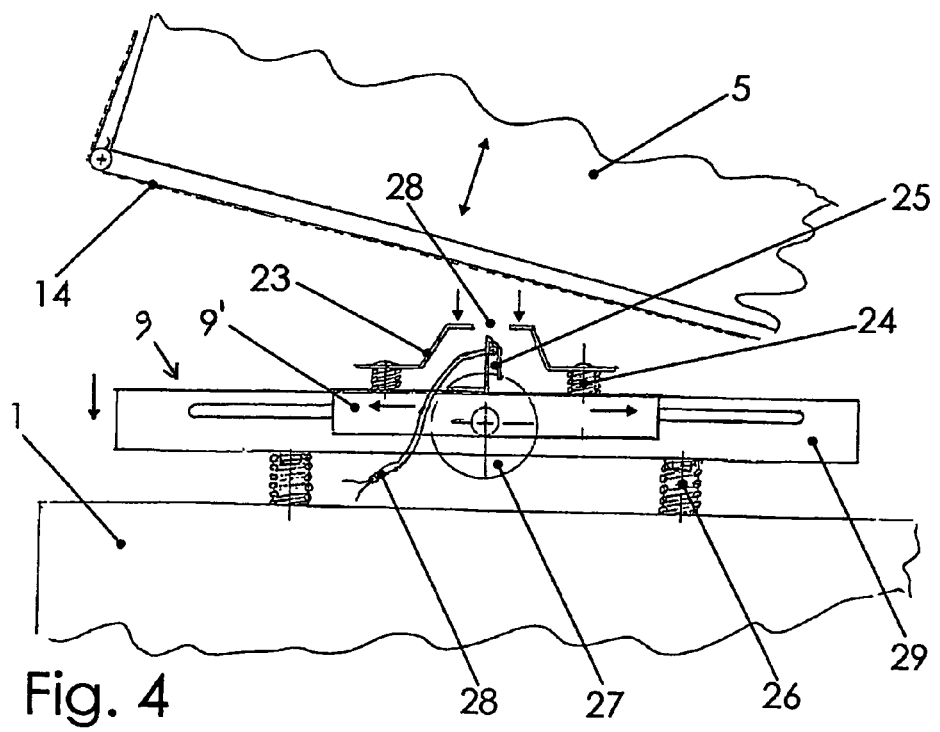
FIG. 4 is a detailed view of the device in FIG. 1 that shows the film cutting means.

FIG. 4 first of all shows the cutter assembly 9 for the film 14.

Such cutter 9 is composed of a blade 25, preferably made of steel, heated through an electric resistance placed inside it. This blade 25 is secured onto an insulated metal guide 9' that is longitudinally slidable as shown by the arrows and is secured in the desired position by means of knobs 27.

The hot blade 25 with the packaging head 5 lifted is protected by a screen 23 placed on springs 24. The hot blade 25, going out in 28 from the recess obtained on the screen 23, operates on the plastic film 14 stretched under the packaging head 5 generating the melt cutting of the film 14. The whole hot blade assembly 29 is placed on springs 26 that, during the packaging head 5 lowering operation, are pressed together with the springs 24. As already described, with pressed springs 24, the hot blade 25 goes out of the screen 23 by means of the recess 28 generating the plastic film 14 cutting, and the springs 26 accompany the hot blade assembly 29 in parallel with the descent of the packaging head 5 and allow the hot blade 25 to operate for a longer time for cutting the film 14.

Figure 5:
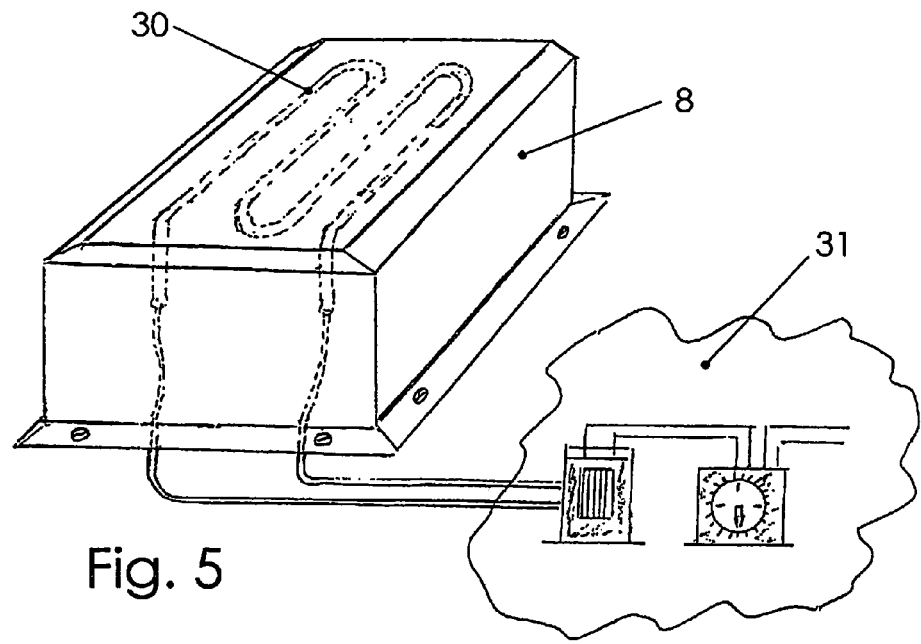
FIG. 5 is a detailed view of the device in FIG. 1 that shows the supporting and heating means.

FIG. 5 instead shows in detail the heated plane 8 for resting the product to be packaged.

Such plane 8 is placed on the machine basement 1 in a central position to the packaging area of the head 5. This resting plane 8 for the products to be packaged is heated through electric resistances 30 placed inside the metallic box 8 composing it. Obviously, the heated plane 8 temperature is not relevant and remains within the limits of the operator safety standards. The temperature is adjusted by a suitable electric thermoregulating system 31 inserted into the basement 1.

The purpose of having a hot resting plane 8, as already previously described, is welding the film 14 edges placed under the product in contact with the hot plane 8 after having packaged the product.

Figure 6:
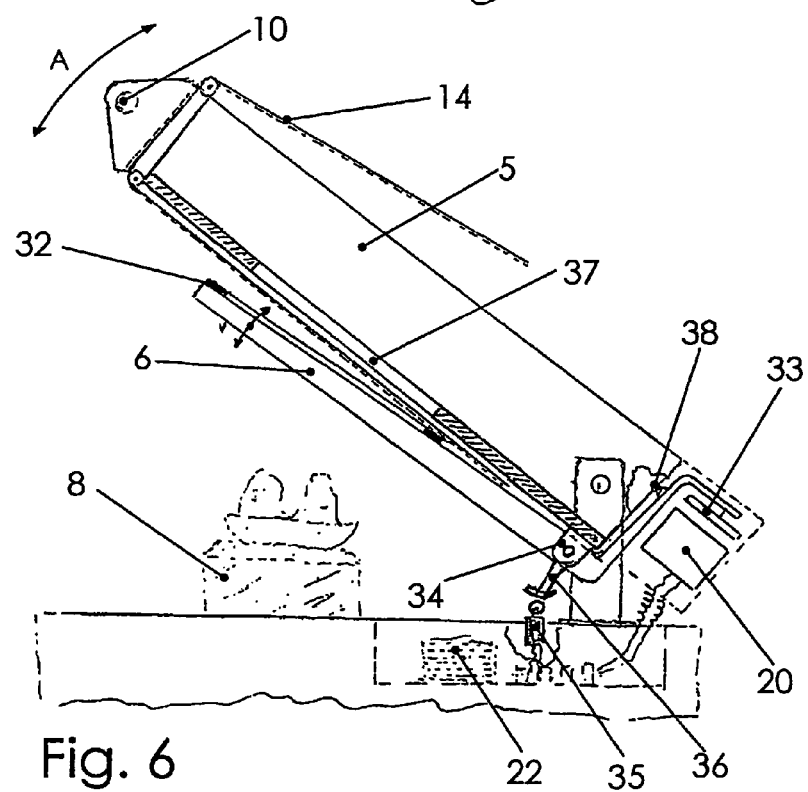
FIG. 6 is a detailed view of the device in FIG. 1 that shows the packaging cover with the film pressing frame.

FIG. 6 schematically shows the frame 6 for pressure-locking the film 14 and the related control mechanism 20.

Figure 13:
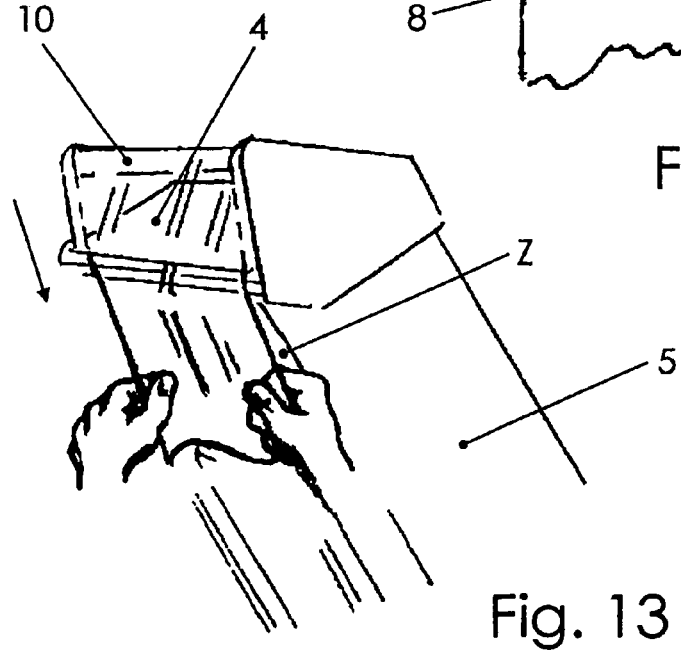
FIG. 13 is a schematic view that shows a manual film supply mode in the device in FIG. 1.

With basculating packaging head 5 lifted, the pressing frame 6 of the film 14 is opened with respect to the plane Z of the packaging head 5. The film 14 is manually inserted (FIG. 13) from the top downwards in the space existing between frame 6 and plane Z of the packaging head 5. The length of the inserted film is adjusted depending on the width of the product to be packaged.

As shown in FIG. 6, the pressing frame 6 of the film 14 is composed of a frame 6 hinged to the lower end 34 of the basculating packaging head 5. This frame, preferably built like a fork, has a rim 32 inserted whose size is equal to the external perimeter of the hole 37 of the packaging head 5, where a gasket (not shown) is inserted, adapted to block the film 14 with the frame 6 closed. A suitable electromagnet 20, placed integral with the basculating head 5, is controlled by the feeler system 36 of the limit sensor 35 and a related electric system, and starts operating when the packaging head 5 starts lowering. The metallic striker of the magnet 33 integral with the lever connected to the pressing frame 6—fulcrum 34 is attracted through an electric pulse towards the magnet 20, making the frame 6 close and locking the plastic film 14 with a force that is proportional to the electric current intensity operating on the magnet 20 itself.

At the end of the electric current pulse on the magnet 20, the frame 6 goes back to its opening position through the action of a spring 38 that works under traction.

During the basculating packaging head 5 descent, the plastic film 14, blocked by the pressing frame 6 onto the hole perimeter of the packaging head 5, is stretched by inserting the product itself placed on the heated plane 8.

At the lower end-of-stroke, the packaging head 5, by abutting onto its suitable striker, actuates the limit sensor 35 and, through motor 19 and transmission belts 17, actuates the blades 15, 16, 45, 46, that wind the product with the plastic film 14 by also inserting it under the product placed on the hot plane 8.

The movement of the blades 15, 16, 45, 46 is automatic and reciprocating, controlled by limit sensors 39 and 40.

Figure 7:
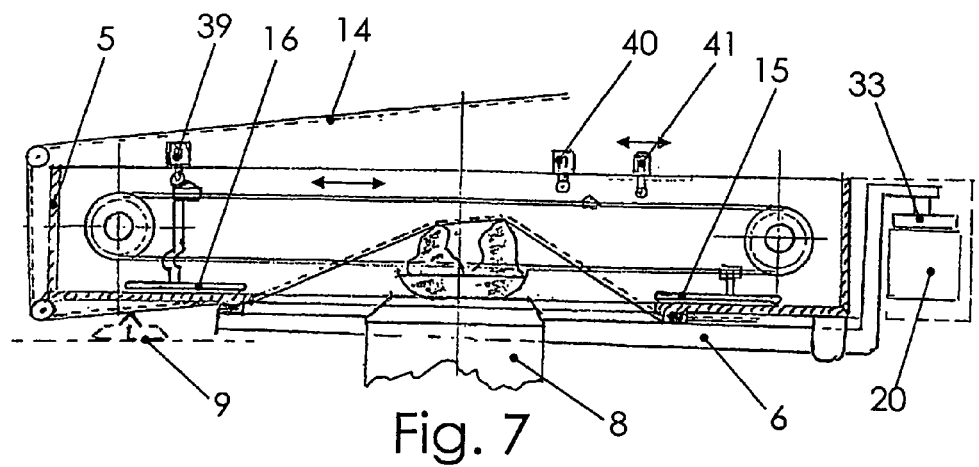
FIG. 7 is a detailed view of the device in FIG. 2 with the cover in a closing position.

Upon starting the blades 15, 16, 45, 46 for packaging the product, the pressing frame 6 of the plastic film 14 is opened, freeing the film 14 that has already been cut by the hot blade 9, and the blades 15, 16, 45, 46 proceed in packaging the product itself. The detachment of the pressing frame 6 of the film 14 from the base Z of the packaging head 5 is controlled by the limit sensor 41, that is longitudinally adjustable as shown by the arrow in FIG. 7. This adjustment allows delaying or anticipating the frame 6 detachment that locks the plastic film 14, in order to obtain a greater or lower film 14 tension when packaging the product.

Figure 8:
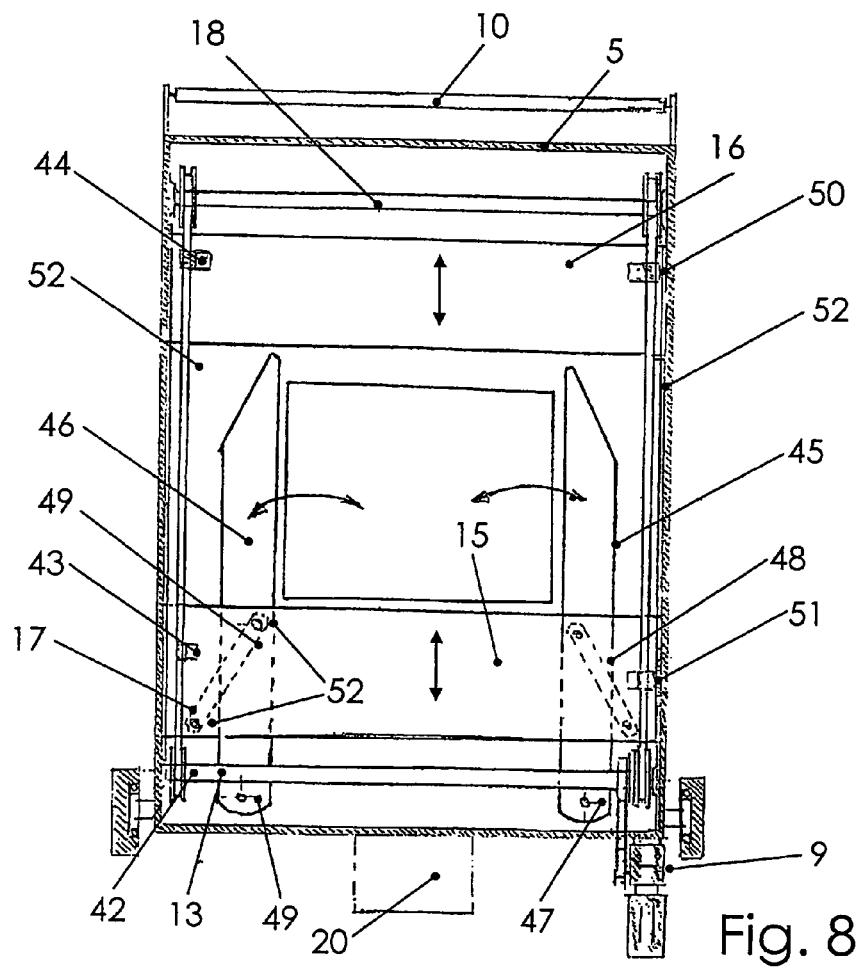
FIG. 8 is a top view of the device in FIG. 1.

FIG. 8 schematically shows in a plan view the packaging head 5. It is composed of a metallic container, having a plane bottom with an adequate opening for the maximum format of the packages that the machine can perform. The supports carrying the rotating shafts 18 are fixed to the metal walls of such container. At the ends of these rotating shafts 18, two toothed pulleys that carry a toothed belt 17 (or similar transmission means) are fixed. The packaging blades 15, 16, arranged on lateral guides 53 and overlapped as in FIG. 9, are connected to the toothed belts 17, by means of clamps 43, 44, 50, 51. These packaging blades 15, 16, 45, 46 can translate on the lateral guides 53 by means of clamps 43, 44, 50, 51 connected to the toothed belts 17 till they overlap. The movement of the belts 17 is transmitted by the system with ratio-motor 19, toothed pulleys, rotating shafts 18.

As already described previously, these blades 15, 16, 45, 46 have an automatic reciprocating movement as shown by the arrows (FIG. 8).

The blade 15 is connected, by means of two oscillating arms 48, 49 and two rotating pins 52 for each arm 48, 49, to the two blades 45, 46 that are longitudinally placed with respect to the head 5 and transversally placed with respect to the blades 15, 16. During the translation approaching movement of the blades 15, 16, the two arms 48, 49 are hinged through the rotating pins 52 on the blade 15 and the blades 45, 46: these latter ones thereby converge towards the center of the packaging area as shown by the arrows (FIGS. 8 and 19). As already previously described, the movement of the blades 15, 16, 45, 46 is reciprocating, being connected to the ratio-motor-toothed pulleys-rotating shafts-terminals system.

Figure 11:
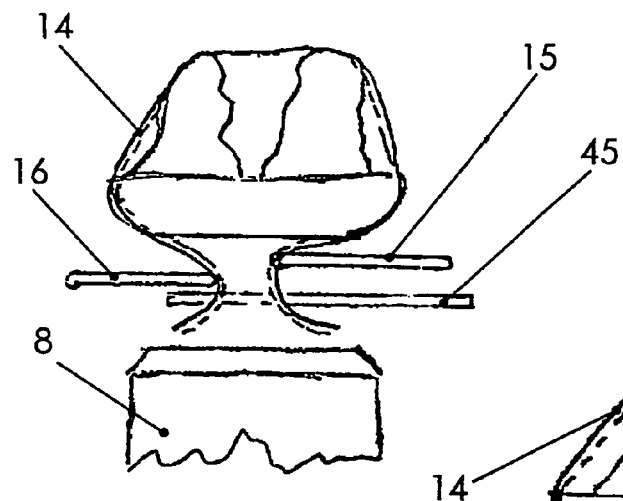
FIG. 11 is a part of the blade bending operation on the product.
Figure 12:
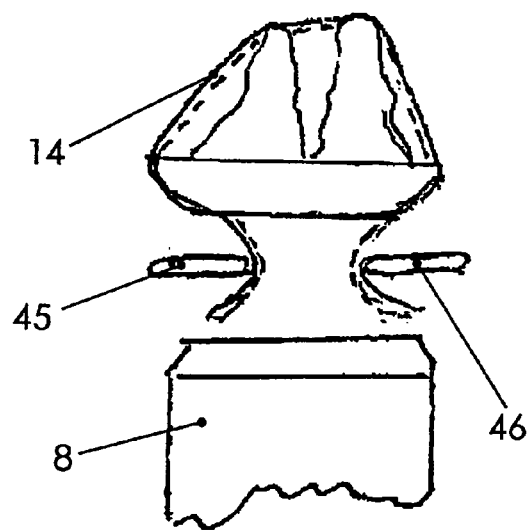
FIG. 12 is a part of another blade bending operation on the product.

FIGS. 11 and 12 schematically show the overlapping and position of the blades 15, 16, 45, 46 during the product packaging cycle. As schematically shown in FIG. 11, the blades 15, 16 when approaching, insert the film 14 under the product on two sides and the blades 45, 46 (FIG. 12) insert the film 14 simultaneously under the product on the other two sides; then, the film 14 under the product appears with the four edges overlapped by the blades 15, 16, 45, 46 and welded by means of heat supplied by the heating plane 8.

Figure 14:
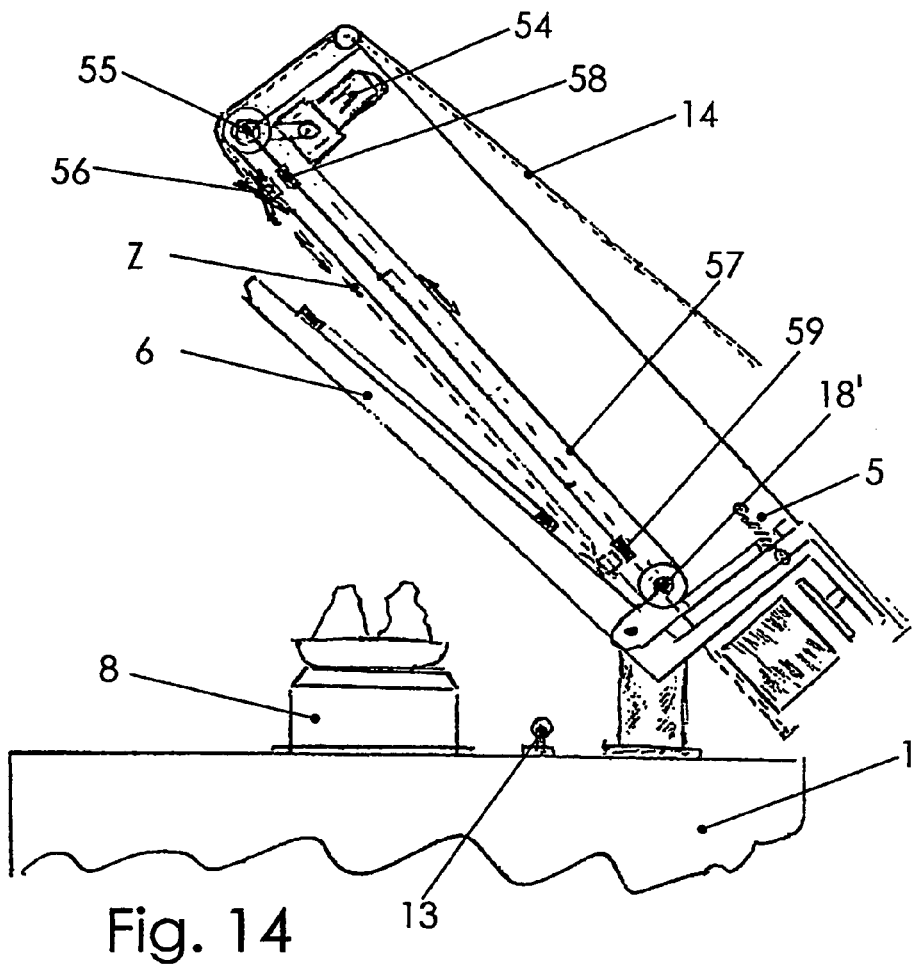
FIG. 14 is a side sectional view that shows an automatic film supply mode in the device in FIG. 1.
Figure 15:
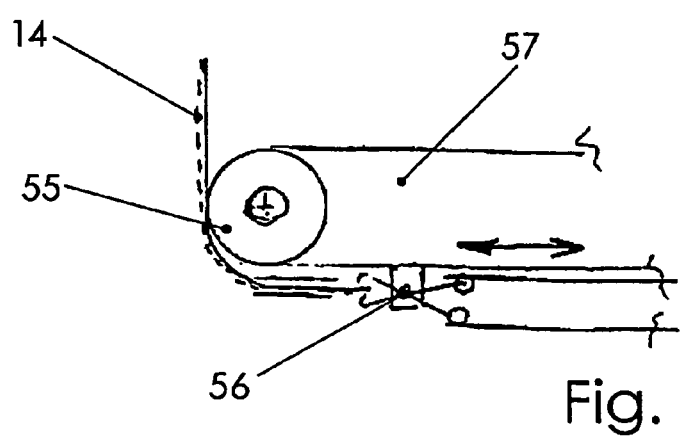
FIG. 15 is a detailed view of part of FIG. 14.

An improvement as regards the use of the machine is shown in FIG. 14 and FIG. 15. They show a schematic view related to the automatic positioning of the film 14. The film 14 is passed on a motored rotating roller 55. This roller 55 is connected through transmission belts to the roller 18'. The ratio-motor assembly 54, operating on the roller 55, starts operating the transmission belts (placed on the sides of the packaging head 5). The transmission belts are connected to and control the jaws 56 that are opened and closed with a mechanical system that operates thereon when they reach the translation point determined by the limit sensors 58, 59. These limit sensors 58, 59, according to their position, make the jaws 56 translate, and the jaws 56 grip and drag the plastic film 14 inserting it between plane "Z" of the packaging head 5 and the pressing frame 6 of the film 14.

This gripping movement of the film 14 by the jaws 56 automatically occurs when the packaging head 5 is lifted in its upper stop position, thereby facilitating the operator's manual handling during the product packaging process.

According to a variation of the device of the invention shown in FIG. 16, the head 5 is adapted to perform, in addition to the opening and closing movement by lifting and lowering, a basculating approach and retraction movement with respect to the device structure: such movements of the head 5 are provided to facilitate the works of a responsible operator. They are obtained in particular because the head 5 is connected to the shoulders 2 through a toggle pin 60 adapted to provide at one of its ends 62 a point secured to the head 5 and at another of its ends 64 a rotating pin point with the shoulders 2.

According to a further variation of the inventive device, also shown in FIG. 16, the means 8 for supporting and heating the product are adapted to slide along the basement 1 of the device in order to further facilitate the works of a responsible operator. In particular, the means 8 can slide onto the basement 1 through sliding guides 66 or other suitable systems, being then stopped in their operating position once having loaded thereon the product to be packaged.

With the above-described device, it is possible to realize an automated or partially automated inventive process, that comprises the following main steps:

supporting and simultaneously heating one of the products to be packaged on a lower abutment side of the product;

supplying the film 14 from the storage means 4 in a position overlaying the product to be packaged;

clamping the film 14 in the position overlaying the product to be packaged;

contacting the clamped film 14 with the product to be packaged, in such a way as to adhere the film 14 to the product in a stretched position;

cutting the film 14 in stretched contact with the product along its side that is still not connected to the film 14 coming from the storage means 4;

releasing the cut film 14 in stretched contact with the product;

bending the film 14 under the product through a bending action on a whole lower perimeter of the product, where such bending step allows the film 14 to adhere to the product on its lower heated abutment side by glueing together the four edges of the film 14; and removing the product packaged in the film 14.

In particular, the step of contacting the clamped film 14 with the product to be packaged is performed by keeping the product still and by placing above it the clamped film 14, but it could also be performed in reverse, namely by keeping the clamped film 14 still and by pushing the product against it.

Moreover, the step of contacting the clamped film 14 with the product further comprises adjusting the film 14 tension onto the product, while the step of clamping the film 14 further comprises the step of adjusting the film 14 locking pressure by adjusting the electric voltage on the magnet 20.

According to a further particular feature of the inventive process, the step of clamping the film 14 further comprises the step of performing a film 14 unlocking that is variable in time, with respect to the device cycle, with respect to the step of bending the film 14.

And still, the step of cutting the film 14 is performed through cutting means 25 and the process further comprises the step of heating the cutting means 25 before the step of cutting the film 14.

In a variation of the inventive process, it further comprises, after the step of supporting the product, the step of placing the product in a prefixed packaging position.

Moreover, the step of bending the film 14 under the product could occur simultaneously on all sides of the product, or could occur firstly on two product sides and then on other two product sides opposed therewith.

Finally, the inventive process further comprises the step of pressing the product to keep the product still during its packaging with the film 14.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

The invention claimed is:

1. A process for packaging products in a stretchable plastic film, wherein the process comprises:
   a. supporting and simultaneously heating one of the products to be packaged on a lower abutment side of the product;
   b. supplying the film from a storage means in a position overlaying the product to be packaged;
   c. clamping the film in the position overlaying the product to be packaged;
   d. contacting the clamped film with the product to be packaged as to adhere the film to the product in a stretched position;
   e. cutting the film in stretched contact with the product along the side of the film which is not adhered to the product;
   f. releasing the cut film in stretched contact with the product;
   g. bending the film under the product through a bending action on a whole lower perimeter of the product, the bending step allowing the film to adhere to the product on the product lower heated abutment side by sealing together the four edges of the film; and
   h. removing die product packaged in the film.

2. The process according to claim 1, wherein contacting the clamped film with the product to be packaged is performed by keeping the product stationary and by placing above the product the clamped film.

3. The process according to claim 1, wherein contacting the clamped film with the product to be packaged is performed by keeping the clamped film still and by pushing the product against the clamped film.

4. The process according to claim 1, wherein contacting the clamped film with the product further comprises adjusting the film tension onto the product.

5. The process according to claim 1, wherein clamping the film further comprises adjusting the film locking pressure by adjusting the electric voltage on the magnet.

6. The process according to claim 1, wherein clamping the film further comprises performing a film unlocking that is variable in time, with respect to the device cycle, and with respect to bending the film.

7. The process according to claim 1, wherein cutting the film is performed through cutting means and the process further comprises heating the cutting means before cutting the film.

8. The process according to claim 1, wherein the process further comprises placing the product in a prefixed packaging position after supporting the product.

9. The process according to claim 1, wherein bending the film under the product occurs simultaneously on all sides of the product.

10. The process according to claim 1, wherein bending the film under the product occurs firstly on two product sides and then on two other opposing product sides.

11. The process according to claim 1, wherein the process further comprises pressing the product to keep the product still during packaging with the film.

12. A device for packaging products in a stretchable plastic film, comprising:
   a. means for simultaneously supporting one of the products to be packaged and for heating a lower abutment side of the products to be packaged;
   b. means for supplying the film from storage means in a position overlaying the product to be packaged;
   c. means for clamping the film in the position overlaying the product to be packaged;
   d. means for contacting the clamped film with the product to be packaged, in such a way as to adhere the film to the product in a stretched position;
   e. means far cutting the film in stretched contact with the product along the product side that is still not connected to the film coming from the storage means;
   f. means for releasing the cut film in stretched contact with the product;
   g. means for bending the film under the product through a bending action on a whole lower perimeter of the product, the bending means allowing the film to adhere to the product on the product lower heated abutment side;
   h. means for removing the product packaged in the film; and
   i. control means for checking the operations of the device.

13. The device according to claim 12, wherein the means for contacting the clamped film with the product to be packaged comprises at least one oscillating head with a basculating movement.

14. The device according to claim 13, wherein the basculating movement of the head is accomplished manually.

15. The device according to claim 13, wherein the basculating movement of the head is accomplished with a motor.

16. The device according to claim 13, wherein the head comprises a bottom that has an opening for inserting the product to be packaged.

17. The device according to claim 13, wherein the head further comprises means for adjusting the tension of the film on the product.

18. The device according to claim 17, wherein the means for adjusting the tension of the film comprises at least one limit sensor whose detection position is adjustable along an axis of the head.

19. The device according to claim 12, wherein the means for clamping the film comprises a pressing frame that is hinged to the means for contacting the clamped film and is adapted to be oscillatingly opened and closed with respect to the means for contacting the clamped film.

20. The device according to claim 19, wherein the pressing frame comprises means adapted to perform the locking of the film.

21. The device according to claim 20, wherein the means adapted to perform the locking of the film comprises an electromagnet integral with the basculating head and controlled by a feeler system of a limit sensor and by a related electric system, the electromagnet starting to operate when the packaging head starts to be lowered, a metallic abutment of the magnet integral with a lever connected to the pressing frame—which is attracted through an electric pulse onto the magnet thereby making the frame close and locking the plastic film with a force that is proportional to the electric current intensity operating on the magnet.

22. The device according to claim 19, wherein the pressing frame comprises means for unlocking the film.

23. The device according to claim 22, wherein the means for unlocking the film comprises a spring which retracts the frame to an opening position.

24. The device according to claim 12, wherein the means for cutting the film comprises at least one retractable hot blade which is adjustable along the film length.

25. The device according to claim 24, wherein the blade for cutting the plastic film is protected by an oscillating screen and is arranged on an oscillating blade assembly.

26. The device according to claim 25, wherein the screen and the blade assembly are oscillating on respective springs in order to perform a film cutting that is prolonged in time, when the head is lowered and presses the hot blade assembly.

27. The device according to claim 24, wherein the blade for cutting the plastic film comprises heating means with electric resistance under direct current or with electric pulses.

28. The device according to claim 24, wherein the blade for cutting the plastic film performs the film cutting with a mechanical knife.

29. The device according to claim 24, wherein the blade for cutting the plastic film is placed on the means for contacting the clamped film.

30. The device according to claim 12, wherein the means for supporting one of the products to be packaged and heating the product lower abutment side comprises at least one hot plane, the hot plane comprises adjustable height and adjustable temperature.

31. The device according to claim 12, wherein the means for supporting one of the products to be packaged are fixed with respect to the means for contacting the clamped film, the means for supporting one of the products to be packaged being displaced above the means for contacting the clamped film for laying the film above the product to be packaged.

32. The device according to claim 12, wherein the means are moving with respect to the means for supporting one of the products to be packaged, the means for supporting one of the products to be packaged being lifted to push the product against the film being kept still by the means for contacting the claimed film.

33. The device according to claim 12, further comprises a moving retractable abutment adapted to place the product to be packaged onto the means for supporting one of the products to be packaged.

34. The device according to claim 33, wherein the moving retractable abutment is controlled by mechanical and electromechanical mechanisms that are activated when the basculating packaging head is lowered.

35. The device according to claim 12, wherein the means for bending the film under the product comprises packaging blades that move along an opposed alternate direction and simultaneously on the film.

36. The device according to claim 35, wherein the packaging blades are overlapped in pairs, with respect to each other.

37. The device according to claim 35, wherein a movement of the blades is automatic and reciprocating, and is further controlled by limit sensors.

38. The device according to claim 35, wherein at least one of the blades is connected, by means of two oscillating arms and two rotating pins for each arm, to at least one other blade that is longitudinally placed with respect to the head and transversally placed with respect to at least one of the blades.

39. The device according to claim 12, wherein the means for bending the film under the product comprises packaging blades that are moving along an opposed alternate direction, non-simultaneously.

40. The device according to claim 12, further comprising means for rendering the product stationary that are adapted to keep the product still during packaging with the film.

41. The device according to claim 12, wherein the means for supplying the film are manually operated.

42. The device according to claim 12, wherein the means for supplying the film comprises motored rotating rollers and jaws, the rollers being mutually connected through transmission belts, a ratio-motor assembly operating on the roller to operate the transmission belts placed on the packaging head sides, the transmission belts being connected to and driving and moving the jaws that are opened and closed through a mechanical system that operates on the jaws when they reach a translation point determined by limit sensors, the limit sensors, according to their position, making the jaws translate, the jaws catching and dragging the plastic film to perform the film insertion between the plane of the packaging head and the film pressing frame, the film catching movement of the jaws automatically occurring when the packaging head is lifted in the head top stopped position.

43. The device according to claim 12, wherein the means for contacting the clamped film are adapted to perform, in addition to the opening and closing movement through lifting and lowering, a basculating advancement and retreat movement with respect to a structure of the device, the movements of the means for contacting the clamped film facilitating the work of an operator.

44. The device according to claim 43, wherein the means for contacting the clamped film are connected to shoulders through a toggle pin adapted to provide at one of the toggle pin ends a point fixed to the means for contacting the clamped film and at another of the toggle pin ends a pivot point rotating with the shoulders.

45. The device according to claim 12, wherein the means for supporting and heating the product are adapted to slide along a basement of the device to facilitate the work of an operator.

46. The device according to claim 45, wherein the means for supporting one of the products to be packaged slide onto the basement through sliding guides.

* * * * *

UNITED STATES PATENT AND TRADEMARK OFFICE
CERTIFICATE OF CORRECTION

| | |
|---|---|
| PATENT NO. | : 7,124,555 B2 |
| APPLICATION NO. | : 10/534897 |
| DATED | : October 24, 2006 |
| INVENTOR(S) | : Francesco Torre |

Page 1 of 1

It is certified that error appears in the above-identified patent and that said Letters Patent is hereby corrected as shown below:

Col. 7, line 30, "die" should be -- the --.

Col. 8, line 11, "far" should be -- for --.

Signed and Sealed this

Twenty-sixth Day of December, 2006

JON W. DUDAS
*Director of the United States Patent and Trademark Office*